E. POSSON.
EQUALIZER AND BRAKE MECHANISM FOR CAR TRUCKS.
APPLICATION FILED MAR. 20, 1916.
1,363,347.
Patented Dec. 28, 1920.
6 SHEETS—SHEET 4.
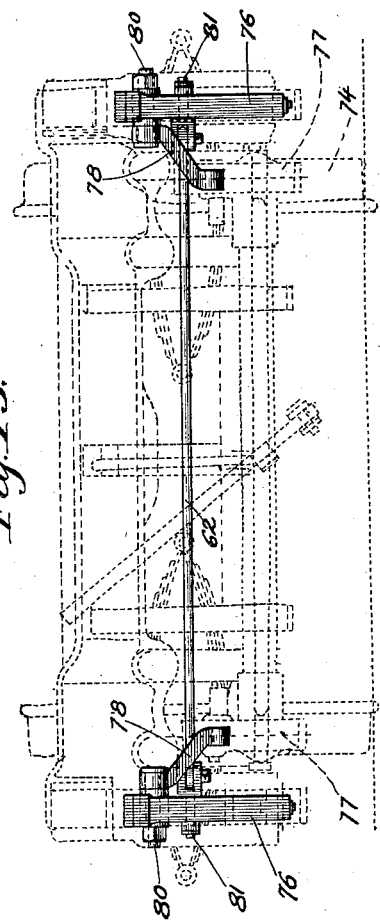
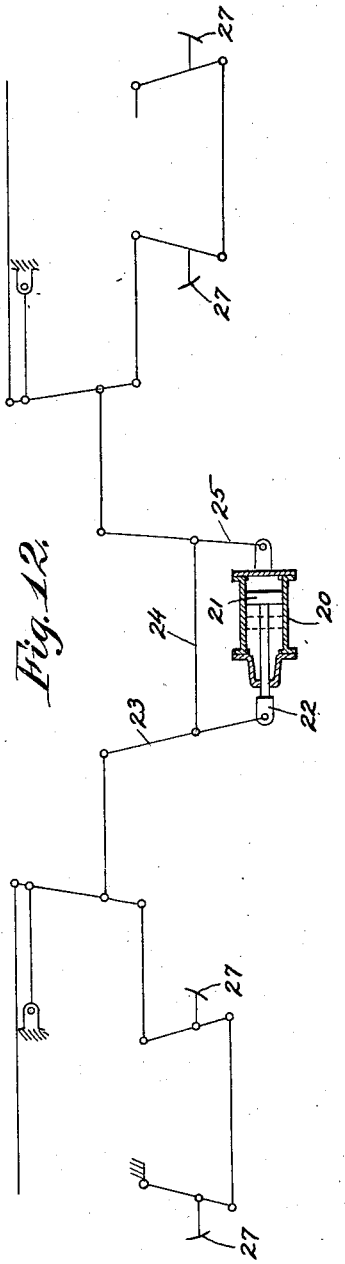
Witness:
C. W. Burnap
Inventor:
Edward Posson
By Sheridan, Wilkinson and Scott, Att'ys

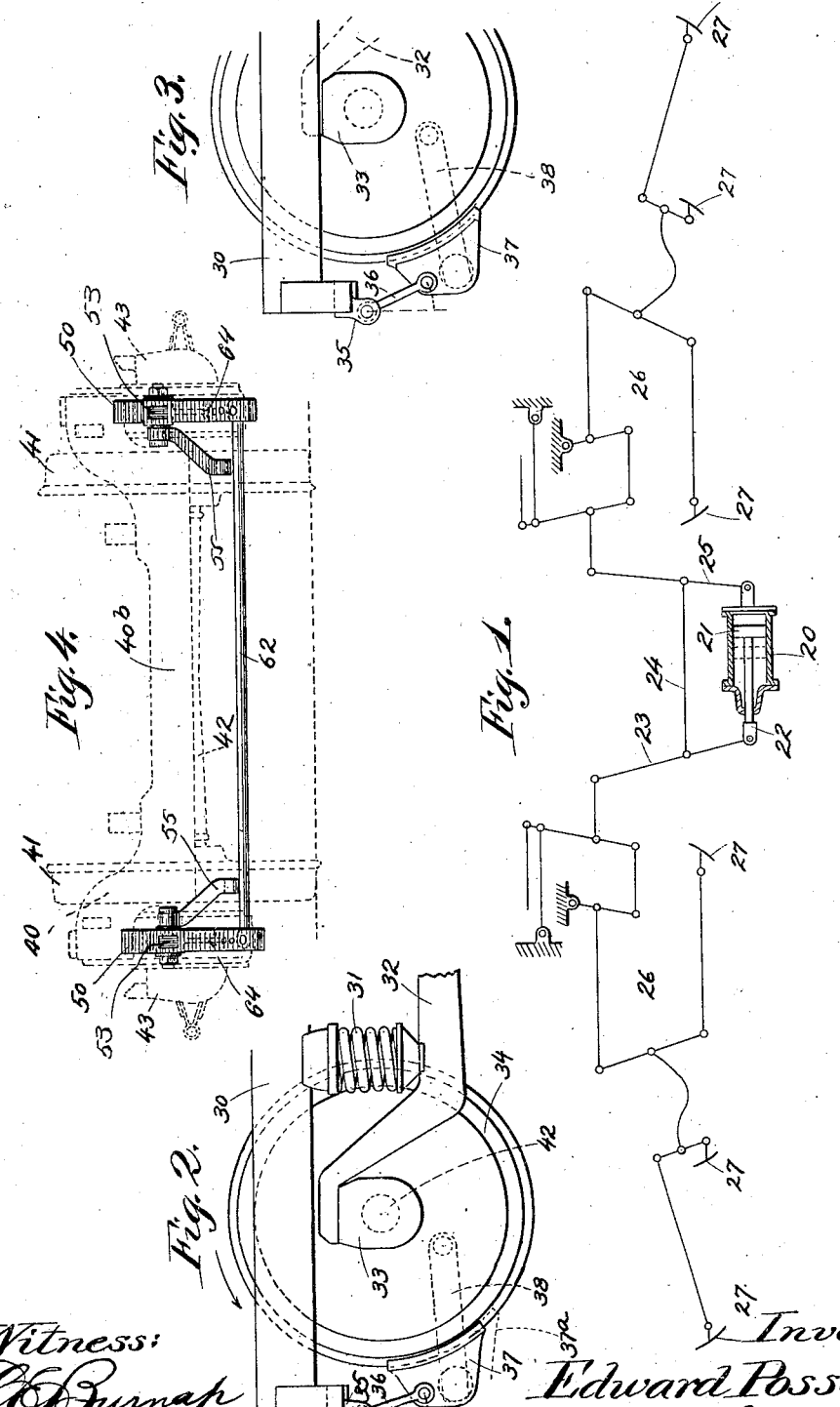

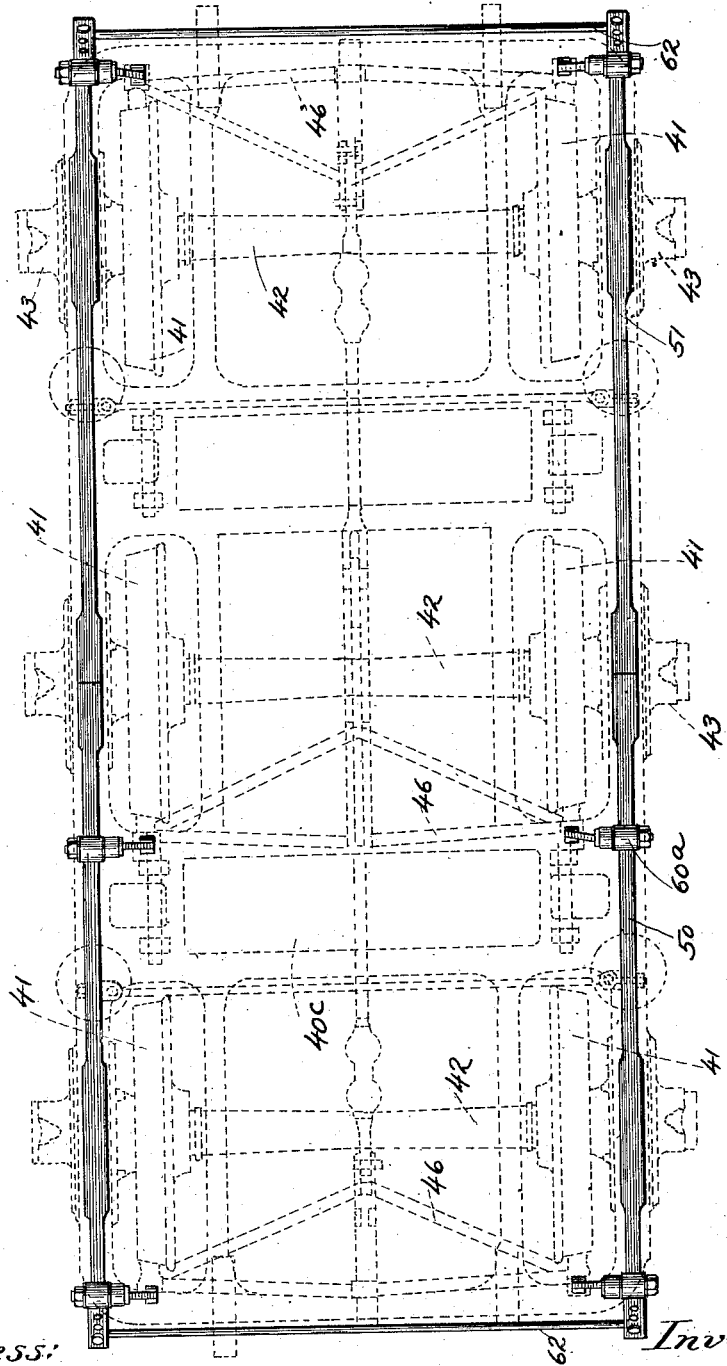

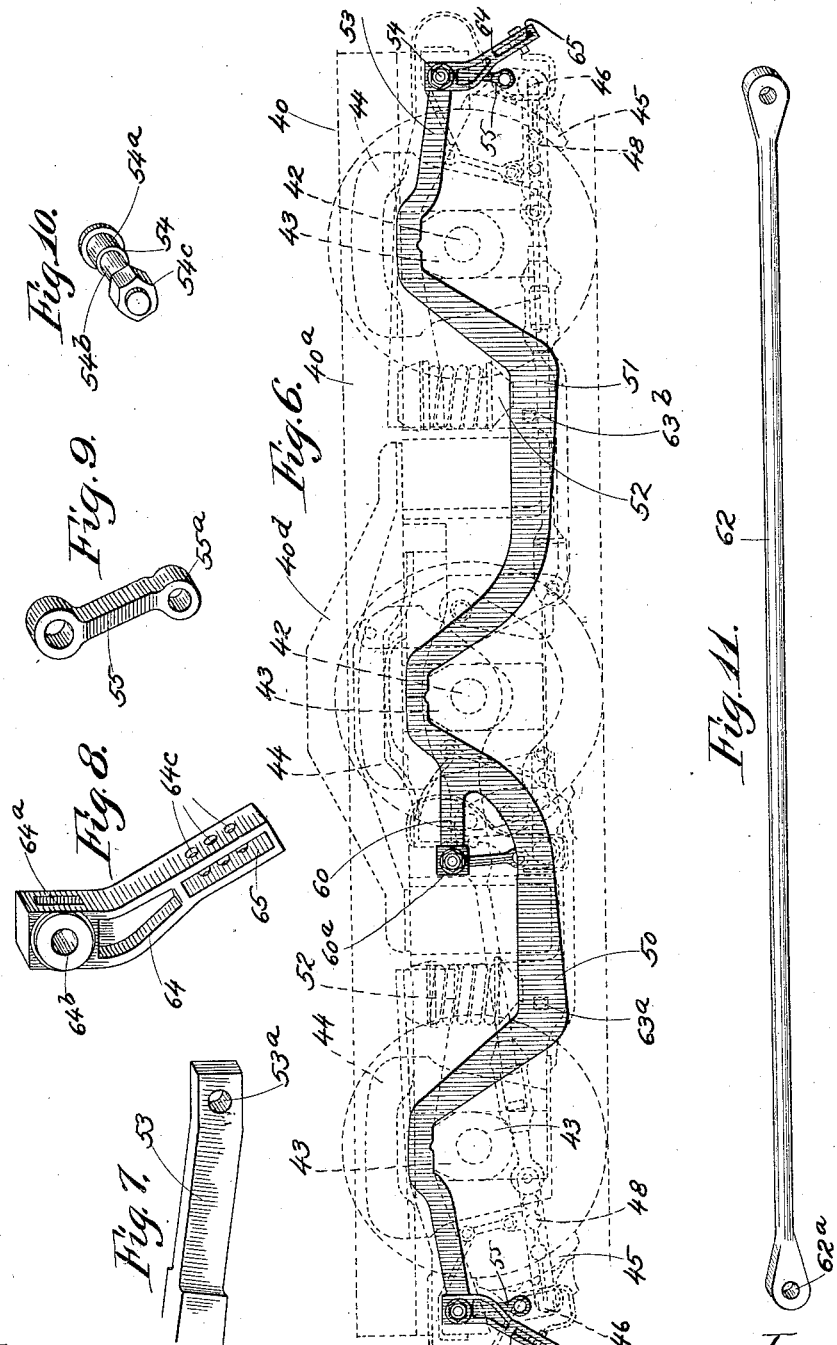

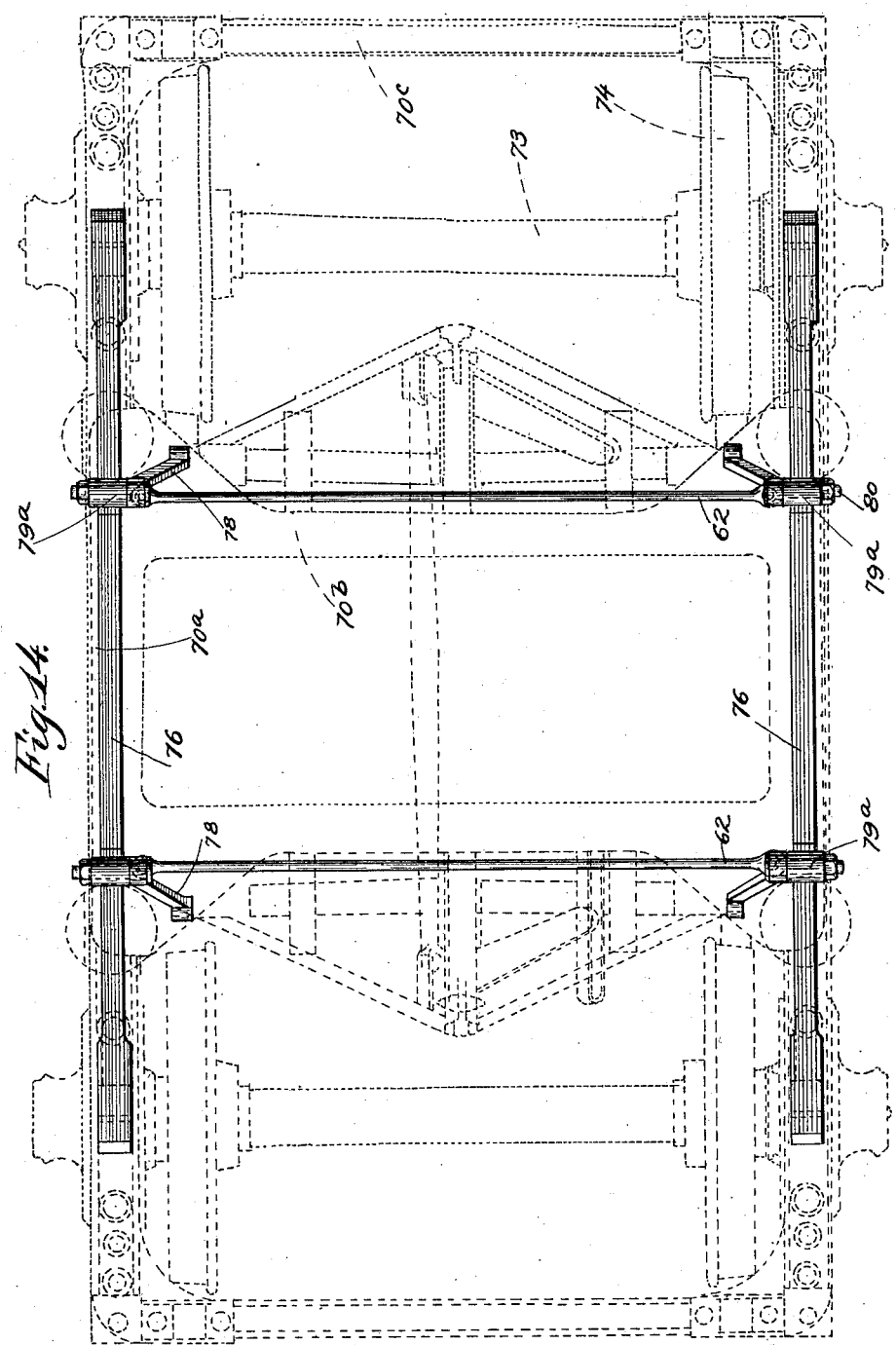

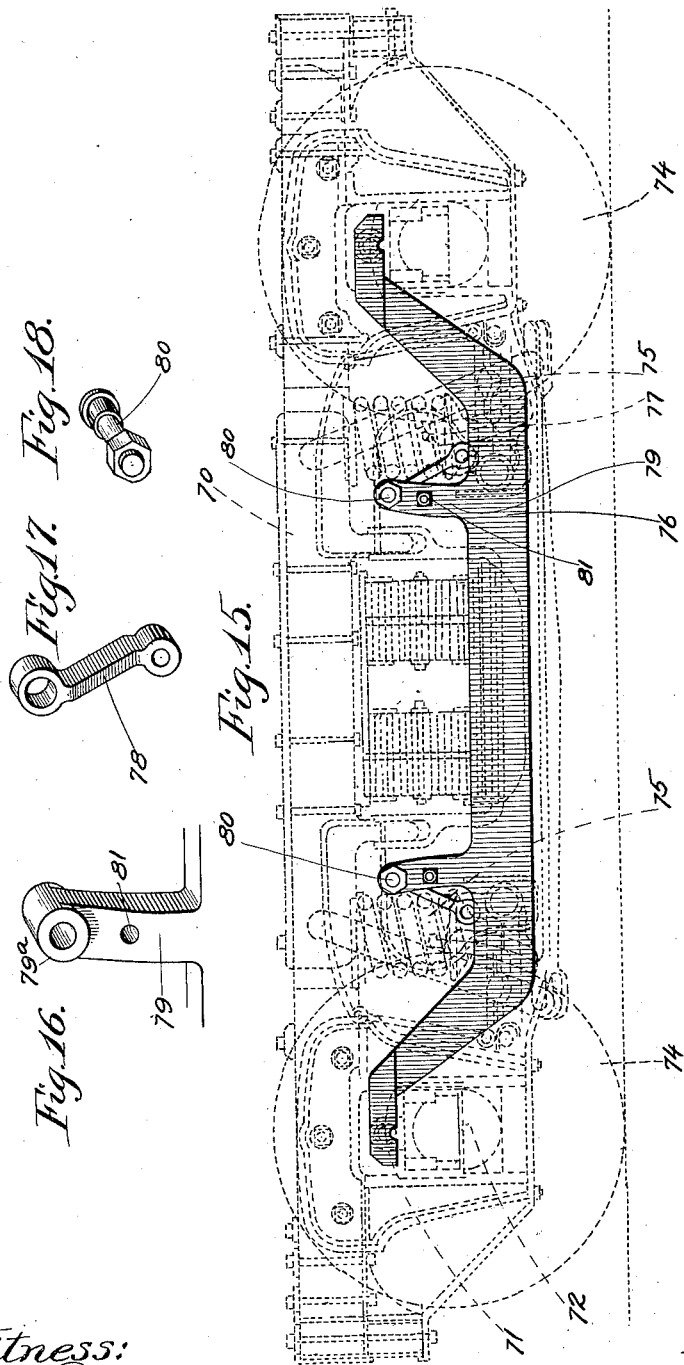

UNITED STATES PATENT OFFICE.

EDWARD POSSON, OF CHICAGO, ILLINOIS.

EQUALIZER AND BRAKE MECHANISM FOR CAR-TRUCKS.

1,363,347.   Specification of Letters Patent.   Patented Dec. 28, 1920.

Application filed March 20, 1916. Serial No. 85,461.

*To all whom it may concern:*

Be it known that I, EDWARD POSSON, a citizen of the United States, residing at Chicago, in the county of Cook and State of Illinois, have invented certain new and useful Improvements in Equalizer and Brake Mechanism for Car-Trucks, of which the following is a specification.

This invention relates to improvements in car trucks, more especially to improvements in brake hanging mechanism, particularly in passenger car trucks, or other trucks in which equalizer bars are employed to distribute the load on the frame of the truck to the various axles which support the equalizer bars.

It has been the usual practice heretofore, particularly in the construction of car trucks for passenger cars, to employ equalizer bars supported by the journal boxes, which bars receive and distribute the load carried by the truck frame, the truck springs being inserted between the equalizer bars and the frame, so that there is a movement of the frame with respect to the equalizer bars, axles, and wheels. Where the brake beams and brake shoes are suspended from the truck frame, as has been the usual practice heretofore, the loading of the truck frame, or the setting of the brakes, operates to produce a downward movement of the brake shoes with respect to the wheels and axles, so that the brake shoes grip the peripheries of the wheels at points nearer to the rails than they do when there is no load on the truck. For instance, when the brakes are set, and the periphery of the car wheel is moving downwardly over a brake shoe, the wheel has a tendency to carry the brake shoe with it, thereby compressing the truck spring, even when the car is unloaded, and causing the shoe to grip the periphery of the wheel in a position much lower than it otherwise would, with the result that the brake levers have a greater travel, causing a corresponding increased piston movement and increased expansion of the compressed air, or the like, in the brake cylinder carried by the car. When the car is loaded, the compression of the truck springs causes a corresponding downward movement of the brake shoes with respect to the car axles, so that the shoes grip the wheels at points nearer to the rail, whereby the brake levers and brake pistons have a corresponding increased travel. This increased travel of some of the brake pistons, and the corresponding increased expansion of the compressed fluid admitted to the cylinders in which those pistons work, operates to cause an unequal setting of the brakes. It is well known that, according to the usual practice, substantially equal quantities of compressed air, or the like, are admitted from the train pipe to the brake cylinders of each car of the train, and the pressures exerted by the expansion of these quantities of compressed fluid are proportional to the degree of expansion thereof, so that if some of the pistons have greater travel than others, such increased travel, and corresponding increased expansion, will result in a decreased pressure being exerted by the corresponding brake shoes on the car wheels with which they coact. Thus some of the brake shoes may grip their wheels with a relatively high pressure, while other brake shoes will grip their wheels with a very light pressure, causing the truck frames to be tilted longitudinally of the car, and some cars to be stopped before other adjacent cars have been stopped, with the result that the cars jolt and bump into each other in a manner which could be avoided if the brakes were set properly.

It is the principal object of this invention to overcome the difficulties above pointed out by providing a brake hanging mechanism which will maintain the brake beams and brake shoes in relatively fixed positions with respect to their wheels and axles, regardless of the degree of compression of the truck springs. A further object is to provide improved means for suspending the brake beams and brake shoes from the equalizer bars of the car truck. Another object is to provide an improved equalizing bar comprising means for supporting the brake hangers. Still another object is to provide means for supporting the brake beams and brake shoes from the equalizing bars, or the like, without interfering with the other parts of the usual car truck construction. A still further object is to provide an improved equalizer bar comprising integrally formed brake hanger supports. Still another object is to provide means for interconnecting the equalizer bars on opposite sides of the car truck, in order to prevent lateral tilting of the equalizer bars under the influence of the braking mechanism. Still another object is to provide means for adapting the features of this invention to various forms of car trucks.

These and other objects of the invention will appear more clearly from the following specification, taken in connection with the accompanying drawings, in which certain particular embodiments of the invention are illustrated.

In the drawings—

Figure 1 is a diagrammatic view, showing a common form of brake lever arrangement on a railway car having six-wheel trucks.

Fig. 2 shows a partial side elevation of a car truck constructed according to the prior practice, showing the brake hanger suspended from the truck frame.

Fig. 3 is a view similar to Fig. 2, showing the relative positions of the parts after the truck springs have been compressed and the brake shoe moved downwardly along the periphery of the car wheel.

Fig. 4 shows an end elevation of a six-wheel car truck embodying the features of my invention.

Fig. 5 is a top plan view of the six-wheel truck illustrated in Fig. 4.

Fig. 6 is a side elevation of the truck illustrated in Figs. 4 and 5.

Fig. 7 is a perspective view of one of the supporting arms for the brake hangers.

Fig. 8 is a perspective view of a tie rod bracket used in connection with the form of construction illustrated in Figs. 4, 5, and 6.

Fig. 9 is a perspective view of a brake beam hanger.

Fig. 10 is a perspective view of a brake beam hanger pin.

Fig. 11 is a perspective view of the equalizer bar tie rod.

Fig. 12 is a view similar to Fig. 1, showing diagrammatically a common form of truck lever arrangement used in connection with four-wheel trucks.

Fig. 13 is an end elevation of a four-wheel truck embodying the features of my invention.

Fig. 14 is a top plan view of the car truck illustrated in Fig. 13.

Fig. 15 is a side elevation of the car truck illustrated in Figs. 13 and 14.

Fig. 16 is a perspective view of one of the brake hanger supporting arms embodied in the form of construction illustrated in Figs. 13, 14, and 15.

Fig. 17 is a perspective view of a brake beam hanger used in connection with a four-wheel truck; and Fig. 18 is a perspective view of the brake beam hanger pin used in connection with a four-wheel car truck.

In the construction shown in Fig. 1, the usual air brake cylinder 20 is shown with the usual reciprocating piston 21 mounted therein, the piston being connected through the piston rod 22 with the usual floating brake lever 23, which is connected by a link 24 with the lever 25, one end of which is fulcrumed on the cylinder. It will be seen that the reciprocating movements of the piston will be imparted to the levers 23 and 25, from which motion is transmitted through the lever and link connections, designated generally by the numeral 26, to the brake shoes 27. It will be evident from a study of this diagram that the movement of the brake shoes will be proportional to the movement of the piston, so that if a relatively large movement of the brake shoes is permitted, by reason of their improper positions on the car wheels, a corresponding increased movement of the piston will be permitted, so that the compressed air therein will expand beyond proper working limits, with the result that the pressure exerted by the brake shoes will be below normal.

In Figs. 2 and 3 the usual form of passenger car truck is shown, with the truck frame 30 supported through the truck springs 31 on the equalizer bar 32, which, in turn, rests upon the journal box 33 of the car axle, upon which the car wheel 34 is mounted. The brake hanger carrier 35 is mounted on the truck frame, and the brake hanger 36 serves to suspend the brake shoe 37 from the carrier, the brake hanger being pivotally connected to the carrier and to the brake shoe, or brake beam upon which the shoe is mounted. The brake shoe is actuated by the link 38, which is in turn connected to the brake lever mechanism, as illustrated in Fig. 1, for instance. When the truck frame is in substantially normal position with respect to the equalizer bar and car axle, as shown in Fig. 2, the brake shoe will occupy the normal operative position with respect to the car wheel, as illustrated in Fig. 2. But when the brakes are applied, and the brake shoe passed into engagement with the periphery of the car wheel, the rotation of the wheel will tend to pull the brake shoe downwardly, assuming that the rotation is in the direction indicated by the arrow. Thus, the shoe will be carried to a position such as illustrated by dotted lines 37$^a$, which position is nearer to the rail, so that the horizontal distance between the connection of the link 38 on the brake shoe and the vertical plane of the car axle will be decreased, whereby the link 38, and other parts of the brake shoe mechanism, will have an increased movement, as above explained.

In those instances where the peripheries of the car wheels move upwardly with respect to the brake shoes, the shoes will be carried upwardly while other shoes on the same truck will be carried downwardly, thus further disturbing the balance of the brake setting, which may result, for instance, in the well-known tilting and jerking of the truck frame. When a load is applied to the car truck, resulting in the compression of the springs 31, the effect will be the same, in that the brake shoes will be carried downwardly. The modified position of the brake shoe is shown in Fig. 3, where the truck frame is moved downwardly with respect to the car axle, causing the brake shoe to move forwardly and downwardly around the periphery of the car wheel.

All of the above defects are overcome in this invention by constructing trucks of this class so that the brake beams and hangers will be supported by parts which are relatively fixed with respect to the car axles. The construction shown in Figs. 4 to 11, inclusive, is that of a six-wheel car truck comprising a truck frame 40, which is made up of wheel pieces 40$^a$, end pieces 40$^b$, transverse bolsters 40$^c$, bolster arch bars 40$^d$, and other parts of well-known form. The car wheels 41 are mounted upon the car axles 42 which carry the usual journal boxes 43, which are received between the downwardly extending arms of the pedestals 44 carried by the wheel pieces of the truck frame. The brake shoes 45 are carried by the usual brake beams 46, which are connected through the links 48 with the usual brake lever mechanism. These parts form no part of the present invention, and they are shown and described for the purpose of illustrating the application of the features of this invention to a well-known form of standard car truck.

In cars of this class, equalizer bars 50 and 51 are mounted upon the journal boxes 43, serving to distribute to the different axles of the car truck the load which is carried by the truck frame 40. The truck springs 52 are mounted upon suitable spring seats supported by the equalizer bars, and the weight of the truck frame, and the load carried thereby, is supported upon these coil springs 52, which are in turn supported by the equalizer bars. In this way the load is distributed from the truck frame to the axis of the car through the equalizer bars. Instead of suspending the brake beams and hangers from the truck frame, as in the prior art, they are supported directly by the equalizer bars, which are relatively fixed with respect to the car axles, and for this purpose the oppositely directed ends of the equalizer bars are provided with integrally formed longitudinally extending supporting arms 53, which serve as brake beam hanger brackets. The extremities of these arms are provided with apertures 53$^a$ which are engaged by the brake hanger pins 54, having the form shown in Fig. 10. These hanger pins comprise enlarged cylindrical portions 54$^a$ adjacent the heads thereof, said portions being adapted to form pivotal engagements with the brake beam hangers 55, which are preferably of the form illustrated in Fig. 9, so that the lower extremities thereof are offset inwardly from the vertical planes of the equalizer bars. These lower extremities 55$^a$ are pivotally connected to the brake shoes and brake beams 45 and 46. It will be seen therefore that the brake beams and brake hangers swing about the hanger pins 54, which are carried by the equalizer bars, so that the brake shoes are suspended from parts which are relatively fixed with respect to the axles of the car wheels.

The arms 53 extend longitudinally from the journal boxes carried by the axles which are at opposite ends of the car truck, the brake shoes supported by these arms being adapted to coact with the peripheries of the wheels at the ends of the truck, as shown particularly in Fig. 6. The brake beam and brake shoes, adapted to coöperate with the intermediate wheels of the truck, are supported by the hanger arms 60, which are formed integrally with the equalizer bars—in this instance the equalizer bars 50. These arms are provided at their extremities with hub portions 60$^a$, adapted to receive brake beam hanger pins of the form shown in Fig. 10. The brake beam and brake shoes are suspended from horizontally extending arms 60, by means of brake hangers 55, in the manner above described. The shoulders adjacent the enlarged parts 54$^a$ of the hanger pins coact with the end surfaces of the hub portions 60$^a$, thus permitting free pivotal movement of the brake hangers on the pins. It will be seen that the arms 60 are formed with the upwardly inclined parts of the equalizer bars adjacent one of the journal boxes by which they are supported, although they may be otherwise located if desired.

In order to prevent a possible tilting of the equalizer bars, and a consequent unequal wear on the journal brasses of the journal boxes, means are provided for tying together the equalizer bars located on opposite sides of the truck. This tying mechanism may be omitted if desired, but it may be preferable to use it, especially where the brake beam hangers are offset inwardly as above described, whereby they will exert a diagonal pull on the brake beam hanger pins. This tying mechanism comprises equalizer tie rods 62, which are provided with enlarged apertured extremities 62$^a$, and which are connected to the equalizer bars by means of suitable eye-bolts, jaw bolts, or the like. The equalizer bars may be provided at the points 63$^a$ and 63$^b$, between the car axles, with suitable apertures which are engaged by these eye-bolts, thus tying the equalizer bars directly together.

It may also be desirable to use tying connections at the extremities of the arms 53 formed on the equalizer bars, these connections being made through tie rod brackets 64, which have slots 64ª in their upper extremities adapted to receive the ends of the arms 53, by which they are supported. The heads of these brackets are also provided with transverse apertures 64ᵇ, which are adapted to aline with the apertures 53ª of the supporting arms and to receive the reduced portions 54ᵇ of the brake beam hanger pins. The shoulders, at the junction of the enlarged portions 54ª and the reduced portions 54ᵇ of the hanger pins, will coact with the brackets 64 on one side thereof, and the nuts 54ᶜ, engaging the extremities of the hanger pins, will coact with the opposite sides of the brackets 64, and thus secure the parts in rigid assembled relation. The lower parts of these brackets are preferably inclined longitudinally of the trucks, in order to clear other parts of the car structure. Slots 65 are formed through the lower extremities of the brackets 64, and the walls of these slots are provided with a plurality of alining apertures 64ᶜ, and bolts are adapted to engage any desired one of these apertures and the corresponding apertures 62ª in order to secure the same in adjusted position. By varying the connections between the brackets and the tie rods, the rods may be caused to support the equalizer bars in any desired manner to prevent tilting thereof.

It will be seen that the leverage of the brackets will operate to make the tie rods 62, at the ends of the truck, much more effective for the intended purpose than they would otherwise be. The tie rods which are connected to the equalizer bars between the journal boxes will operate similarly to prevent tilting of such bars about their supports on the journal boxes which are located above the points of connection of these last-named tie rods.

In order to illustrate the adaptation of this invention to another form of car truck, I have illustrated in Figs. 12 to 18, inclusive, the arrangement of the various parts as embodied in a four-wheel car truck. This truck comprises the frame 70, having wheel pieces 70ª, bolsters 70ᵇ, and end pieces 70ᶜ. The usual pedestals 71 are carried by the wheel pieces to engage the lateral sides of the journal boxes 72, which serve as bearings for the car axles 73, upon which the car wheels 74 are mounted. The truck frame is supported upon the usual truck springs 75, which are in turn carried by the equalizer bars 76, which rest at their extremities upon the journal boxes, the body portions of the equalizer bars being located in planes below the extremities thereof which are seated upon the journal boxes, according to the well-known practice. In this instance the brake shoes 77 coact with the peripheries of the wheels which are directed toward the middle portion of the truck, being carried on brake beams and pivotally connected to brake beam hangers 78, which are in turn pivotally connected to the supporting arm 79 through the brake beam hanger pins 80. These supporting arms are carried by, and preferably formed integrally with, the equalizer bars extending upwardly therefrom from points located inwardly from the extremities of the bars. The upper extremities of the arms 79 are provided with hub portions 79ª, which are engaged by the hanger pins 80 in the manner previously described in connection with six-wheel trucks. These hanger pins and brake beam hangers 78 have preferably the same form as the corresponding parts used in connection with the six-wheel truck, so that the lower extremities of the hangers are offset inwardly from the vertical planes of the equalizer bars. For the purpose of preventing tilting of the equalizer bars with respect to the journal boxes, it may be desirable to use the tie rods 62, previously described, which are connected to intermediate points 81 on the supporting arm 79.

Although I have shown and described two particular embodiments of the invention for purposes of illustration, it will be understood that it may be embodied in other forms of construction without departing from the scope thereof as defined in the appended claims.

I claim:—

1. In combination, a car truck comprising equalizer bars supported by the journal boxes thereof, brackets attached to the equalizer bars on opposite sides of the truck and extending downwardly therefrom, connecting means attached to the lower parts of said brackets for preventing the tilting of said equalizer bars on said journal boxes, and means for adjusting said connecting means vertically on said brackets.

2. In a car truck, an equalizer bar adapted to be supported by the journal boxes of said truck, a supporting arm carried by said equalizer bar between the journal boxes by which it is supported, a second supporting arm carried by said equalizer bar and projecting toward the end of said truck from one of said journal boxes, brake shoes adapted to engage the wheels of said truck, and means for hanging said brake shoes on said supporting arms.

3. In a six-wheel car truck, equalizer bars supported by the axles of said truck and extending therebetween, a supporting arm formed integrally with one of said equalizer bars and extending therefrom between two adjacent axles, other supporting arms formed integrally with said equalizer bars and extending in opposite directions from the end axles of the truck, brake shoes adapted to engage the wheels of said truck, and hangers for suspending said brake shoes from said arms.

4. In a device of the class described, a car truck comprising equalizer bars, supporting arms carried by said equalizer bars, brake hangers connected to said arms, and means connected with said arms for connecting the equalizer bars on opposite sides of said truck.

5. In a car truck, equalizer bars, hangers carried by said equalizer bars, brake shoes carried by said hangers, brackets attached to said equalizer bars, tie rods connecting the brackets carried by equalizer bars on opposite sides of the truck, and means for adjusting said tie rods with respect to said brackets.

6. In a car truck, equalizer bars, hangers carried by said equalizer bars, brake shoes carried by said hangers, brackets attached to said equalizer bars, tie rods connecting the brackets carried by equalizer bars on opposite sides of the truck, and other tie rods connected directly to the equalizer bars on opposite sides of the truck.

7. In a car truck, equalizer bars, supporting arms carried by said equalizer bars, brackets mounted on said arms, brake beam hangers, hanger pins for securing said brackets and said hangers on said arms, and means connecting said brackets.

8. In combination, a car truck comprising equalizer bars supported by the journal boxes thereof, brackets detachably secured to the equalizer bars on opposite sides of the truck and extending downwardly therefrom, and tie rods connected to the lower parts of said brackets for preventing the tilting of the equalizer bars on said journal boxes.

9. In combination, a car truck comprising equalizer bars supported on the journal boxes thereof, said equalizer bars being provided with longitudinal extensions at their ends, brackets secured to the ends of said extensions and depending therefrom, said brackets having their lower parts inclined away from the end of the truck, and tie rods connecting the brackets on opposite sides of the truck.

10. In combination, a car truck comprising equalizer bars supported by the journal boxes thereof, said equalizer bars being provided with longitudinal extensions projecting beyond the journal boxes at the end of the truck, brackets having slots adapted to receive said extensions, pins engaging said extensions and the walls of said slots, and tie rods connecting the brackets on opposite sides of the truck.

11. In combination, a car truck comprising equalizer bars supported by the journal boxes thereof, said equalizer bars being provided with longitudinal extensions projecting beyond the journal boxes at the end of the truck, brackets having slots adapted to receive said extensions, pins engaging said extensions and the walls of said slots, brake hangers suspended from said pins, brake shoes carried by said hangers to engage the wheels of said truck, and tie rods connecting the brackets on opposite sides of the truck below said equalizer bars for preventing the tilting of said bars on said journal boxes and for maintaining said brake shoes in alinement with said wheels.

12. In combination, a six-wheel car truck comprising two equalizer bars on each side of the truck, said equalizer bars being supported on the journal boxes of the truck and having integral longitudinal extensions extending beyond the end wheels of the truck, one of said brake hangers on each side of the truck being provided with another integral longitudinal extension extending from a point adjacent the center wheel of the truck to a point beyond said center wheel, brake hangers suspended from all of said integral extensions of said equalizer bars, and brake shoes carried by said hangers to coact with all of the wheels of the truck.

13. In combination, a six-wheel car truck comprising two equalizer bars on each side of the truck, said equalizer bars being supported on the journal boxes of the truck and having integral longitudinal extensions extending beyond the end wheels of the truck, one of said brake hangers on each side of the truck being provided with another integral longitudinal extension extending from a point adjacent the center wheel of the truck to a point beyond said center wheel, brake hangers suspended from all of said integral extensions of said equalizer bars, brake shoes carried by said hangers to coact with all of the wheels of the truck, brackets detachably secured to the ends of the longitudinal extensions formed on the ends of said equalizer bars, said brackets extending downwardly from said equalizer bars and being inclined away from the ends of the truck, and tie rods connecting the lower parts of said brackets on opposite sides of said truck to prevent the tilting of said equalizer bars on said journal boxes and to maintain said brake shoes in alinement with said wheels.

In testimony whereof, I have subscribed my name.

EDWARD POSSON.